United States Patent [19]

Nitsche

[11] Patent Number: 5,269,833
[45] Date of Patent: Dec. 14, 1993

[54] PROCESS FOR CLEANING A STREAM OF CRUDE GAS OR WASTE GAS CHARGED WITH HYDROCARBON VAPORS RESULTING IN RECOVERY OF THE HYDROCARBONS

[76] Inventor: Manfred Nitsche, Twistering 12c, D-2104 Hamburg 92, Fed. Rep. of Germany

[21] Appl. No.: 958,157

[22] Filed: Oct. 9, 1992

[30] Foreign Application Priority Data

Oct. 12, 1991 [DE] Fed. Rep. of Germany ....... 4133869

[51] Int. Cl.$^5$ .......................................... B01D 53/04
[52] U.S. Cl. .......................................... 95/93; 95/94; 95/105; 95/141
[58] Field of Search ............... 55/25, 26, 28, 48, 58, 55/62, 68, 74, 75, 179, 180, 189, 208, 387, 389

[56] References Cited

U.S. PATENT DOCUMENTS

| | | | |
|---|---|---|---|
| 3,225,516 | 12/1965 | Smith et al. | 55/25 |
| 3,867,111 | 2/1975 | Knowles | 55/58 X |
| 4,056,369 | 11/1977 | Quackenbush | 55/58 |
| 4,066,423 | 1/1978 | McGill et al. | 55/58 X |
| 4,261,716 | 4/1981 | Schwartz et al. | 55/387 |
| 4,276,058 | 6/1981 | Dinsmore | 55/58 X |
| 4,305,734 | 12/1981 | McGill | 55/25 |
| 4,338,101 | 7/1982 | Tuttle | 55/58 X |
| 4,414,003 | 11/1983 | Blaudszun | 55/28 X |
| 4,421,532 | 12/1983 | Sacchetti et al. | 55/28 |
| 4,462,811 | 7/1984 | Dinsmore et al. | 55/58 X |
| 4,480,393 | 11/1984 | Flink et al. | 55/62 X |
| 4,499,208 | 2/1985 | Fuderer | 55/25 X |
| 4,536,197 | 8/1985 | Cook | 55/28 |
| 4,670,028 | 6/1987 | Kennedy | 55/58 X |
| 4,715,868 | 12/1987 | Kennedy | 55/58 X |
| 4,846,852 | 7/1989 | Schweitzer et al. | 55/62 X |
| 5,144,807 | 9/1992 | Brown | 55/62 X |
| 5,152,812 | 10/1992 | Kovach | 55/62 |

FOREIGN PATENT DOCUMENTS

| | | |
|---|---|---|
| 2743188 | 8/1984 | Fed. Rep. of Germany . |
| 3210236 | 11/1985 | Fed. Rep. of Germany . |
| 2760187 | 9/1989 | Fed. Rep. of Germany . |
| 7802803 | 9/1979 | Netherlands ............... 55/26 |

Primary Examiner—Robert Spitzer
Attorney, Agent, or Firm—Roylance, Abrams, Berdo & Goodman

[57] ABSTRACT

The invention relates to a process for cleaning a stream of crude gas and/or waste gas charged with hydrocarbon vapors resulting in recovery of the hydrocarbons. The process consists of adsorption, desorption, and condensation and/or absorption, and the adsorption is accomplished in two two-stage adsorber systems connected to each other in parallel. A charged stream of gas is first directed to the first adsorber system for coarse cleaning by a primary adsorber (2) and then for precision cleaning to a secondary adsorber (4) connected in series to the first adsorber. The hydrocarbons adsorbed in the primary adsorber (2) are desorbed by use of a vacuum pump (26) and the hydrocarbon vapors depleted of inert gas that are obtained are recovered in the condensation and/or absorption system (24) after compression in the vacuum pump (26) and the hydrocarbon components that are not condensed or absorbed are returned to the stream of crude gas. The hydrocarbons adsorbed in the secondary adsorber (4) are desorbed and are returned to the stream of crude gas after compression in the vacuum pump (27). As soon as the saturation values for the adsorbents in the first adsorber system have been reached, the process is switched to the second adsorber system that has been regenerated and desorbed in the interim and the first adsorber system simultaneously undergoes regeneration and desorption.

4 Claims, 1 Drawing Sheet

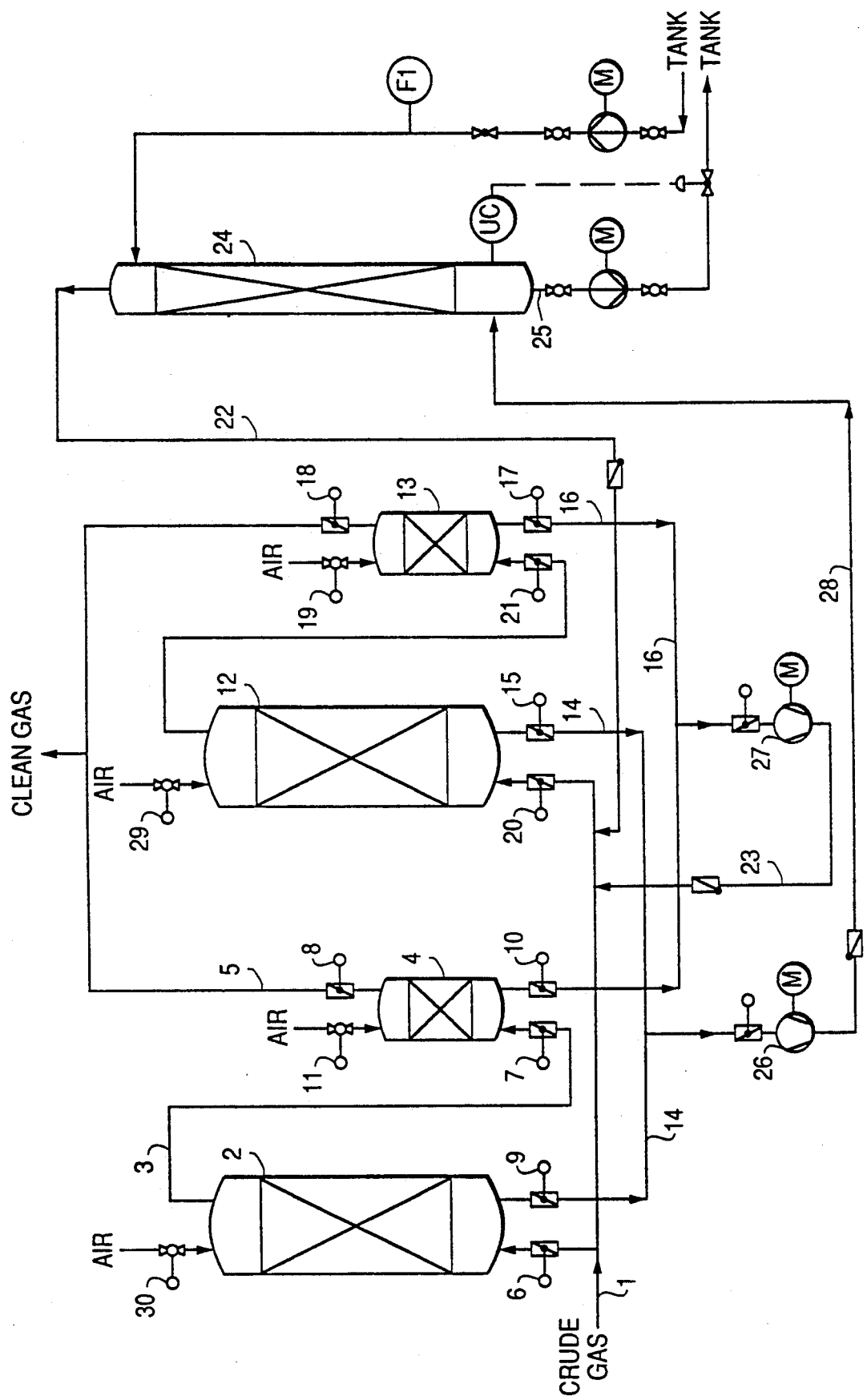

PROCESS FOR CLEANING A STREAM OF CRUDE GAS OR WASTE GAS CHARGED WITH HYDROCARBON VAPORS RESULTING IN RECOVERY OF THE HYDROCARBONS

BACKGROUND OF THE INVENTION

The invention relates to a process for cleaning a stream of crude gas or waste gas charged with hydrocarbon vapors, gasoline vapors in particular, resulting in recovery of the hydrocarbons or gasoline.

During the refueling of tanker trucks, oil tankers, or storage tanks and the like, with inflammable fuels for example, a hydrocarbon-air mixture is formed above the liquid involved and is displaced in the tank by the liquid during the filling process. Unless special precautions are taken, this mixture escapes into the atmosphere. Processes for recovering hydrocarbons from a hydrocarbon-air mixture have been proposed for the purpose of reducing the resulting economically significant losses of hydrocarbons and of abating environmental pollution.

As examples, DE-PS (German Patent) 27 43 188 and DE-PS 27 60 187 describe processes for recovery of light hydrocarbons from a mixture of air and hydrocarbons. In these processes, the hydrocarbon-air mixture is forced through a single-stage adsorber system, the hydrocarbon components being largely adsorbed from the hydrocarbon-air mixture. Two single-stage adsorber systems are connected in parallel, so that, over the period during which the hydrocarbon-air mixture is forced through one adsorber by slight excess pressure, the second adsorber, which already contains adsorbed hydrocarbons, is regenerated under negative pressure. The adsorbed hydrocarbons are desorbed as a hydrocarbon-air mixture, and exhausted by means of a vacuum pump. The mixture is then separated into a liquid and a vapor phase in a separator stage, and the vapor phase is forced through an absorber in which liquid hydrocarbons as absorbent flow in the direction opposite that of the vapor phase containing hydrocarbons, the gaseous hydrocarbons being mostly absorbed or liquefied. The inert gases (air) that cannot be condensed emerge from the absorber at the head under a hydrocarbon charge of approximately 2 kilograms per kilogram of air, and are returned to the flow of crude gas, where they are subjected to treatment again together with the crude gas in a single-stage adsorber.

In these prior art processes, considerable additional adsorber capacity must be kept ready in order to recover the amounts of hydrocarbons returned from the absorber head. Another disadvantage of these prior art processes is that the desorption must be very carefully executed so that the single-stage adsorber downstream will be regenerated as completely as possible so that the adsorber will be able to adsorb sufficiently even difficultly adsorbable components such as propane during the next adsorption phase. Only in this way, is it possible to bring about the required reduction of the hydrocarbon-air mixture at the adsorber head. This can, of course, be accomplished only if the suitable operating conditions are carefully adhered to. First and foremost, a very good vacuum must be created in desorption, something that requires very high vacuum pump performance. In addition, stripping gas must be introduced, this resulting in return of a greater amount of hydrocarbons to the stream of crude gas.

A similar process is disclosed in U.S. Pat. No. 4,261,716, in which two single-stage adsorbers are connected in parallel, so that the hydrocarbon-air mixture can be forced through one of the adsorbers while the other is being regenerated. Inasmuch as the conditions under which the process is executed are very similar to those of the processes referred to in the foregoing German patents, the same disadvantages as described previously result.

In addition, DE-PS 32 10 236 describes a process for cleaning a waste gas stream charged with vapor and/or gaseous pollutants. The initial hydrocarbon charge of the waste gas stream to be treated is first reduced by means of an upstream scrubbing stage, in which high-boiling or difficultly desorbable components are precipitated before they enter the adsorbers. This avoids blockage of the adsorbers by the high-boiling components, so that the operating capacity of the adsorbers is fully available for adsorption of the remaining pollutants. A disadvantage of energy-intensive and cost-intensive, and that under unfavorable conditions can cause icing problems.

SUMMARY OF THE INVENTION

It is the object of the invention to devise a process permitting cleaning of a stream of air charged with crude gas or waste gas, especially an air stream charged with gasoline vapors, with the smallest possible consumption of energy, and in a particularly cost-effective manner. The process is characterized in particular by high flexibility, so that it can easily be adapted to changing conditions, especially as regards varying concentrations and compositions of hydrocarbons in the stream of gas and the incident amounts of crude gas or waste gas.

This object is attained by providing a process for cleaning a stream of crude gas and/or waste gas charged with hydrocarbon vapors resulting in recovery of the hydrocarbons. The process consists of adsorption in which the hydrocarbon vapors are largely removed from the charged stream of gas and the stream of gas is subsequently released into the atmosphere as clean gas, of desorption in which the hydrocarbons adsorbed by a suitable adsorbent are desorbed from the adsorbent by lowering the pressure by means of a vacuum pump and are extracted, and of condensation and/or absorption in which the desorbed hydrocarbons are condensed and-/or absorbed by the liquid hydrocarbons directed in counterflow and are extracted from the process, while the hydrocarbons not condensed or absorbed are returned to the stream of crude gas. The adsorption is carried out in such a way that the stream of gas charged with hydrocarbon vapors is first forced through a first adsorber system until the saturation value of the adsorbent has almost been reached, and then is diverted into a second adsorber system connected in parallel to the first adsorber system. At the same time, the first adsorber system is regenerated under a vacuum and the hydrocarbons desorbed in this process are directed to a condensation and/or absorption system, after which, following completion of regeneration and desorption of the first adsorber system and attainment of the saturation value of the adsorbent in the second adsorber system, the stream of gas charged with the hydrocarbon vapors is directed back to the first adsorber system and the second adsorber system is regenerated and desorbed. The adsorption in both the first and the second adsorber system is executed in two stages, with primary adsorbers (2, 12) for coarse cleaning of the charged stream of gas and secondary adsorbers (4, 13) connected in series with the primary adsorbers for precision cleaning. The hydrocarbons adsorbed in the primary adsorbers are desorbed by means of a vacuum pump (26), stripping gas and/or heat being used if necessary, and the hydrocarbon vapors depleted of inert gas that are obtained are, after compression in the vacuum pump (26), recovered in the condensation and absorption system (24). The hydrocarbon components that are not condensed or absorbed are returned to the stream of crude gas. The hydrocarbons adsorbed in the secondary adsorber (4, 13), stripping gas and/or heat being used if necessary, are desorbed, and the hydrocarbon vapors depleted of inert gas that are obtained are returned to the stream of crude gas after compression in the vacuum pump (27).

BRIEF DESCRIPTION OF THE DRAWING

The drawing is a schematic diagram which illustrates an embodiment of the process of the invention.

DETAILED DESCRIPTION OF THE INVENTION

In the process of the invention, there are two adsorber systems connected in parallel, in two stages, each of the two adsorber systems consisting of a primary adsorber that adsorbs the bulk of the hydrocarbon vapors from the charged gas stream, and a secondary adsorber connected in series with it that adsorbs the bulk of the hydrocarbon vapors still contained in the gas stream after the latter has passed through the primary adsorber. As a result, it is possible to obtain from the charged gas stream more reliably than in the past a clean gas containing an insignificant percentage of hydrocarbon vapors, so that the resulting clean gas may be released into the environment. The primary adsorber performs the function of primary cleaning of the gas stream, which is generally heavily charged with hydrocarbon vapors, and is designed so that it is able to adsorb the hydrocarbon components from a charged gas stream introduced by means of the high adsorption potential and partial pressure of the adsorber. Precision cleaning of the gas stream, subsequently released into the atmosphere as clean gas, takes place in the secondary adsorber connected in series with the primary adsorber so that the entire precleaned gas stream must flow through the secondary adsorber.

Inasmuch as a significant amount of heat is released because of the great amount of hydrocarbons adsorbed in the primary adsorber during primary cleaning, in a preferred embodiment, provision is made that the first step of the adsorption phase is carried out in a primary adsorber that, in addition to the adsorbent, is outfitted with a heat accumulator material, whereby the evolution of heat occurring during adsorption can be significantly reduced.

Another advantage of the process claimed is that the division into primary or coarse cleaning in a primary adsorber and precision cleaning in a secondary adsorber permits application of different process conditions in the two stages, so that each stage may be carried out under especially cost-effective conditions specific to it. This is true both of the adsorption phase and especially of the desorption phase. In order for the primary adsorber to be able to handle even high initial charges in a stream of gas to be cleaned, it is advisable for this adsorber to be designed with the greatest possible intake capacity. Inasmuch as the demands made of the secondary adsorber in this respect are generally lower, a markedly smaller intake capacity can be provided for the secondary adsorber. Hence, in a preferred embodiment of the process claimed, the two-stage in-series adsorption is executed in a larger primary adsorber and a significantly smaller secondary adsorber, regeneration and desorption taking place at different pressures in the two stages, so that a distinctly higher vacuum prevails in the secondary adsorber than in the primary adsorber during the regeneration phase. For example, after establishment of the vacuum, the ultimate pressure in the primary adsorber is around 50 millibar and around 10 millibar in the secondary adsorber; the size relationship between the primary and secondary adsorber may vary over a rather wide range, the adsorption capacity of the secondary adsorber being, for example, 10–25% that of the primary adsorber.

In this way, the conditions in the two adsorption stages can be designed so as to be optimum from the economic and engineering viewpoints. For example, recovery or desorption may be carried out in the primary adsorber with a lower vacuum and with less stripping gas than in prior processes, with the result that the recovery cost can be significantly reduced, because the volume of gas to be extracted and the energy required for operation of the vacuum pumps are lowered. Reduction of the amounts of stripping gas or inert gas also lightens the loads on the condensation or absorption system, and decreases the amount of hydrocarbon vapors introduced into the adsorbers with the non-condensable inert gas.

As has already been stated, the secondary adsorber is used for precision cleaning of the stream of gas already forced through the primary adsorber. Hence, in keeping with this object, the secondary adsorber need be outfitted with an adsorption capacity significantly lower than that of the primary adsorber. Consequently, the process is also preferably executed with a secondary absorber considerably smaller than the primary adsorber. In order that the secondary adsorber may perform its functions to the fullest extent, its regeneration must be done carefully and thoroughly, so that it exhibits only a slight adsorbent charge afterward. This is a prerequisite for execution of the desired and necessary adsorptive precision cleaning in the following process stage. Regeneration or desorption of the secondary adsorber is accordingly accomplished with a higher vacuum than in the primary adsorber, with small amounts of stripping gas added if necessary.

The hydrocarbon vapors, such as gasoline vapors, extracted from the secondary adsorber during desorption by means of vacuum pumps, are returned to the inlet stream of crude gas or waste gas, together with the stripping gas or inert gas stream after compression in the vacuum pump. The hydrocarbon or gasoline concentration in the extracted desorption stream is significantly higher than in the inlet stream, so that adsorption in the primary adsorber is facilitated. The secondary adsorber is thus used both for precision cleaning and for concentration of the hydrocarbon vapors before return to the stream of crude gas or waste gas.

The primary and secondary adsorbers employed in the process claimed contain prior assemblies with an adsorber charge, preferably consisting of active charcoal or carbon molecular sieves or water repellant zeolites.

The process of the invention accordingly contributes particular technical and economic advantages; in particular, great flexibility is achieved as regards the values of the clean gas discharged into the atmosphere, the quality of which gas may be modified by means of the dimensions and mode of operation of the secondary adsorber for hydrocarbon vapor outlet concentrations in clean gas ranging from 0.15 g/Nm$^3$ clean gas to 30 g/Nm$^3$ clean gas (Nm$^3$=standard cubic meter).

It goes without saying that the process of the invention may also be applied to clean waste gas streams charged with solvent vapors to recover a significant amount of solvents.

The invention is described in greater detail with reference to the accompanying drawing.

Crude gas charged with hydrocarbon vapors, such as gasoline vapors, flows through the crude gas line 1 and open valve 6 into the first adsorber system, that is primary adsorber 2, where primary cleaning takes place, and flows through line 3 and open valve 7 into secondary adsorber 4 for precision cleaning. The cleaned waste gas emerges into the atmosphere through the open valve 8 and the line 5. The valves 9, 10, 11 and 30, as well as valve 20 at the inlet to the second adsorber system (primary adsorber 12 and secondary adsorber 13), are closed during this process.

While cleaning of crude gas charged with hydrocarbon vapors, if applicable together with also charged waste gas, takes place in the first adsorber system with primary adsorber 2 and secondary adsorber 4 until the operating capacity of this adsorption system, and especially of primary adsorber 2, is almost exhausted, the primary adsorber 12 and secondary adsorber 13 undergo regeneration and desorption in the second adsorber system. Adsorbed hydrocarbon vapors are extracted by means of vacuum pump 26 or 27 over line 14 from the primary adsorber 12 and over line 16 from the secondary adsorber, stripping gas being added if necessary as accessory by way of valves 19 and 29. The hydrocarbon vapors desorbed from the primary adsorber 12 by vacuum pump 26 are transferred by line 28 to condensation and/or absorption system 24, where they are recovered in liquid form by condensation and/or absorption. The hydrocarbons, such as gasoline, recovered in this manner collect at the bottom of the condensation and/or absorption system 24 and are extracted by line 25 and, are fed, for example, into a suitable tank. Gasoline, for example, may be employed in the condensation and/or absorption system 24 as a suitable wash medium. The mode of operation of a condensation and/or absorption system is known to the expert and is accordingly not described in detail.

The non-condensable hydrocarbon components are drawn off from the head of the condensation and/or absorption system 24 by line 22 and are returned to the crude gas line 1.

The hydrocarbon vapors extracted from the secondary adsorber 13 by vacuum pump 27 during regeneration and desorption are, after compression by means of vacuum pump 27, returned to the crude gas line 1 by way of line 23. During this process, the valves 15, 17, 19 and 29 are open, and the valves 18, 20 and 21 are closed.

After completion of regeneration and desorption of the second adsorber system with primary adsorber 12 and secondary adsorber 13, and before the saturation value of the adsorbent in the first adsorber system with primary adsorber 2 and secondary adsorber 4 has been reached, the stream of gas charged with hydrocarbon vapors is switched to the second adsorber system, and the first adsorber system is regenerated and desorbed in the same manner as described for the second adsorber system. This alternative switching may be continued as desired as soon as the pertinent conditions have been fulfilled.

In a preferred embodiment, primary adsorbers (2, 12) and secondary adsorbers (4, 13), have different adsorbents.

What is claimed is:

1. A process for cleaning a stream of crude gas and-/or waste gas charged with hydrocarbon vapors resulting in recovery of the hydrocarbons, the process consisting of adsorption in which the hydrocarbon vapors are largely removed from the charged stream of gas and the stream of gas is subsequently released into the atmosphere as clean gas, of desorption in which the hydrocarbons adsorbed by a suitable adsorbent are desorbed from the adsorbent by lowering the pressure by means of a vacuum and are extracted, and of condensation and/or absorption in which the desorbed hydrocarbons are condensed and/or absorbed by liquid hydrocarbons directed in counterflow and are extracted from the process, while the hydrocarbons not condensed or absorbed are returned to the stream of crude gas, the adsorption being carried out in such a way that the stream of gas charged with hydrocarbon vapors is first forced through a first adsorber system until the saturation value of the adsorbent has almost been reached, and then is diverted into a second adsorber system connected in parallel to the first adsorber system, while at the same time the first adsorber system is regenerated under a vacuum and the hydrocarbons desorbed in this process are directed to a condensation and/or absorption system, after which, following completion of regeneration and desorption of the first adsorber system and attainment of the saturation value of the adsorbent in the second adsorber system, the stream of gas charged with the hydrocarbon vapors is directed back to the first adsorber system and the second adsorber system is regenerated and desorbed, wherein the adsorption in both the first and the second adsorber system is executed in two stages, with primary adsorbers (2, 12) for coarse cleaning of the charged stream of gas and secondary adsorbers (4, 13) connected in series with the primary adsorbers for precision cleaning, the hydrocarbons adsorbed in the primary adsorbers being desorbed by means of a vacuum pump (26), stripping gas and/or heat being used if necessary, and the hydrocarbon vapors depleted of inert gas that are obtained being after compression in the vacuum pump (26) recovered in the condensation and absorption system (24) and the hydrocarbon components that are not condensed or absorbed being returned to the stream of crude gas, while the hydrocarbons adsorbed in the secondary adsorber (4, 13), stripping gas and/or heat being used if necessary, are desorbed and the hydrocarbon vapors depleted of inert gas that are obtained are returned to the stream of crude gas after compression in a vacuum pump (27).

2. A process as claimed in claim 1, wherein the two-stage adsorption is executed sequentially in said primary adsorber (2, 12) of larger size and in said secondary adsorber (4, 13) of significantly smaller size, the regeneration and desorption in the two stages taking place at different pressures in such a way that a significantly better vacuum than in the primary adsorber prevails in the secondary adsorber in the regeneration and desorption phase.

3. A process as claimed in claim 2, wherein the first stage of adsorption is carried out in said primary adsorber (2, 12) that is provided with a heat accumulator material in addition to the adsorbent.

4. A process as claimed in claim 3, wherein primary adsorbers (2, 12) and secondary adsorbers (4, 13) having different adsorbents are used for adsorption.

* * * * *